(12) United States Patent
Ma et al.

(10) Patent No.: US 11,719,945 B2
(45) Date of Patent: Aug. 8, 2023

(54) METHOD FOR LOCATING VR DEVICE AND VR DEVICE

(71) Applicant: Qingdao Pico Technology Co., Ltd., Shandong (CN)

(72) Inventors: Xiaowei Ma, Qingdao (CN); Xuebing Deng, Qingdao (CN); Xuebin Gao, Qingdao (CN)

(73) Assignee: QINGDAO PICO TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/881,085

(22) Filed: Aug. 4, 2022

(65) Prior Publication Data

US 2022/0373811 A1 Nov. 24, 2022

Related U.S. Application Data

(63) Continuation of application No. PCT/CN2021/132287, filed on Nov. 23, 2021.

(30) Foreign Application Priority Data

Mar. 29, 2021 (CN) .......................... 202110334951.2

(51) Int. Cl.
*G02B 27/01* (2006.01)
*H04W 4/02* (2018.01)

(52) U.S. Cl.
CPC ........ *G02B 27/0176* (2013.01); *H04W 4/025* (2013.01); *G02B 2027/0138* (2013.01)

(58) Field of Classification Search
CPC ........ G02B 2027/0138; G02B 27/0176; Y02B 20/40; H05B 45/30; H05B 47/19; H05B 45/37; G06F 3/012; H04W 4/025
See application file for complete search history.

(56) References Cited

U.S. PATENT DOCUMENTS

2018/0196509 A1 7/2018 Trail
2018/0330521 A1* 11/2018 Samples ................. G06F 3/011
(Continued)

FOREIGN PATENT DOCUMENTS

CN 101592305 A 12/2009
CN 106768361 A 5/2017
(Continued)

OTHER PUBLICATIONS

First Office Action with translation dated Feb. 28, 2022 by The State Intellectual Property Office of People's Republic of China in corresponding Chinese Patent Application No. 202110334951.2. (21 pages).
(Continued)

*Primary Examiner* — Muhammad N Edun
(74) *Attorney, Agent, or Firm* — Buchanan Ingersoll & Rooney PC (57) ABSTRACT

A method for locating a VR device and a VR device is applied to a head-mounted displaying device of the VR device, and includes: sending a locating and synchronizing signal to the handle at a first preset interval, so that the handle controls each of LED lights of the LED light ring according to the locating and synchronizing signal to lighten for a first preset duration; simultaneously while the head-mounted displaying device is sending the locating and synchronizing signal, controlling, by the head-mounted displaying device, the camera to expose for a second preset duration to photograph the handle to obtain at least one locating photograph, wherein a starting time of the second preset duration is earlier than a starting time of the first preset duration, and the second preset duration is longer than the first preset duration; and determining spatial-position information of the handle according to the locating photograph.

6 Claims, 3 Drawing Sheets

(56) References Cited

U.S. PATENT DOCUMENTS

2019/0012835 A1\* 1/2019 Bleyer .................. G06T 19/006
2021/0074336 A1 3/2021 Kumagai et al.
2021/0365064 A1\* 11/2021 Liu ....................... G06F 3/0346

FOREIGN PATENT DOCUMENTS

| CN | 108553882 A | 9/2018 |
| CN | 108965712 A | 12/2018 |
| CN | 110572635 A | 12/2019 |
| CN | 111355897 A | 6/2020 |
| CN | 111935414 A | 11/2020 |
| CN | 112451962 A | 3/2021 |
| CN | 112532046 A | 3/2021 |
| CN | 112559398 A | 3/2021 |
| CN | 113225870 A | 8/2021 |
| WO | 2020110929 A1 | 6/2020 |

OTHER PUBLICATIONS

International Search Report (PCT/ISA/210) with translation dated Feb. 10, 2022 by the Patent Office of State IP Office (ISA/CN) as the International Searching Authority for International Application No. PCT/CN2021/132287. (5 pages).

Office Action (Notification of the First Office Action) dated Dec. 14, 2022, by the State Intellectual Property Office of People's Republic of China in corresponding Chinese Patent Application No. 202110334951.2 and an English Translation of the Office Action. (16 pages).

\* cited by examiner

METHOD FOR LOCATING VR DEVICE AND VR DEVICE

CROSS REFERENCE TO RELATED APPLICATIONS

This application is entered as a bypass continuation application under 35 U.S.C. § 111(a) of International Application No. PCT/CN2021/132287, filed on Nov. 23, 2021, which claims priority to Chinese Patent Application No. 202110334951.2, filed on Mar. 29, 2021. The embodiments of the earlier-filed applications are hereby incorporated herein in their entirety by reference.

TECHNICAL FIELD

The present application relates to the technical field of Virtual Reality (VR) devices, in particular to a method for locating a VR device and a VR device.

BACKGROUND

LED (Light Emitting Diode) lights are an electronic device often used in VR devices currently. Its main function is to serve as a locating mark on the handle or the head mounted device, so that the external camera or the camera of the head-mounted displaying device (HMD) can capture its position, then calculate according to a certain algorithm to obtain the specific position information of the handle or the head mounted device, and send the location information to the VR device to realize the locating of the VR device.

LED lights are applied to hand-held controllers such as a handle as an electronic label. In order to recognize the LED lights by the cameras at a long distance, the brightness of the LED lights needs to meet certain requirements. Therefore, a large current is required to lighten the LED lights, which will lead to many problems. For example, the power consumption of handles is large. The handles are typically powered by dry batteries or small lithium batteries, and the large power consumption will lead to frequent replacement of the dry batteries or frequent charging of the lithium batteries. Moreover, the large power consumption of the handle will be accompanied by serious heating. Those problems will affect the user experience.

It should be noted that the description here only provides background information related to the present application, and does not necessarily constitute the prior art.

SUMMARY

In view of the above problems, the present application provides a method for locating a VR device and a VR device, so as to overcome or at least partially solve the above problems of high power consumption and serious heating of the device caused by the lightening of the LED lights.

In order to achieve the above object, the present application provides the following technical solutions.

According to one aspect of the present application, a method for locating a VR device is provided, wherein the VR device comprises a head-mounted displaying device and at least one handle, the head-mounted displaying device is provided with a camera, the handle is provided with an LED light ring, and the head-mounted displaying device is connected with the handle in wireless communication. The method is applied to the head-mounted displaying device, and comprises:

sending a locating and synchronizing signal to the handle at a first preset interval, so that the handle controls each of LED lights of the LED light ring according to the locating and synchronizing signal to lighten for a first preset duration;

simultaneously while sending the locating and synchronizing signal, controlling the camera to expose for a second preset duration to photograph the handle to obtain at least one locating photograph, wherein a starting time of the second preset duration is earlier than a starting time of the first preset duration, and the second preset duration is longer than the first preset duration; and determining spatial-position information of the handle according to the locating photograph.

According to another aspect of the present application, a VR device is provided, wherein the VR device comprises a head-mounted displaying device and at least one handle, the head-mounted displaying device is provided with a camera, the handle is provided with an LED light ring, and the head-mounted displaying device is connected with the handle in wireless communication;

the handle comprises a battery, a first DC/DC circuit, a microcontroller unit, an LED driving chip and a second DC/DC circuit;

the battery is electrically connected to a cathode of each of the LED lights of the LED light ring through the first DC/DC circuit, the microcontroller unit and the LED driving chip in sequence; and the battery is electrically connected to an anode of each of the LED lights of the LED light ring through the second DC/DC circuit, and the battery supplies power to the microcontroller unit through the first DC/DC circuit;

wherein the second DC/DC circuit is configured for raising a power-supply voltage of the battery to a preset voltage for lightening each of the LED lights of the LED light ring, and the LED driving chip is configured for setting a current value when each of the LED lights of the LED light ring is lightened;

the head-mounted displaying device sends a locating and synchronizing signal to the microcontroller unit of the handle at a first preset interval, so that the microcontroller unit controls the LED driving chip according to the locating and synchronizing signal to drive each of the LED lights of the LED light ring to lighten for a first preset duration;

simultaneously while the head-mounted displaying device is sending the locating and synchronizing signal, the head-mounted displaying device controls the camera to expose for a second preset duration to photograph the handle to obtain at least one locating photograph, wherein a starting time of the second preset duration is earlier than a starting time of the first preset duration, and the second preset duration is longer than the first preset duration;

the head-mounted displaying device determines spatial-position information of the handle according to the locating photograph.

In conclusion, the present application can achieve at least the following advantageous effects.

The head-mounted displaying device sends the locating and synchronizing signal to the handle periodically, so that the handle controls the LED lights on it to turn on and off periodically according to the locating and synchronizing signal, and simultaneously controls the camera on the head-mounted displaying device to expose and photograph the handle. Because the first preset duration of controlling the LED lights to be lightened each time is less than the second preset duration of the camera exposure, and the starting time of the second preset duration is earlier than the starting time of the first preset duration, the lightening of the LED lights on the handle is consistent with the exposure and photographing of the handle by the camera, so that the requirement on the brightness for capturing the LED lights by the camera can be met, and therefore the camera can accurately and stably capture the locating pictures of the handle. Moreover, the lightening duration of the LED lights is reduced, thereby significantly reducing the power consumption and the heating of the handle, which greatly improves the user experience.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF DRAWINGS

By reading the following detailed description of the preferable embodiments, various other advantages and benefits will become clear to a person skilled in the art. The drawings are merely intended to show the preferable embodiments, and are not to be considered as limiting the present application. Furthermore, throughout the drawings, the same reference signs denote the same elements. In the drawings.

DETAILED DESCRIPTION

The exemplary embodiments of the present application will be described in further detail below with reference to the drawings. Although the drawings illustrate the exemplary embodiments of the present application, it should be understood that the present application may be implemented in various forms, which should not be limited by the embodiments illustrated herein. In contrast, the purpose of providing those embodiments is to more clearly understand the present application, and to completely convey the scope of the present application to a person skilled in the art.

In the description of the present application, it should be noted that the terms that indicate orientation or position relations, such as "center", "upper", "lower", "left", "right", "vertical", "horizontal", "inside" and "outside", are based on the orientation or position relations shown in the drawings, and are merely for conveniently describing the present application and simplifying the description, rather than indicating or implying that the device or element must have the specific orientation and be constructed and operated according to the specific orientation. Therefore, they should not be construed as a limitation on the present application. Moreover, the terms "first", "second" and "third" are merely for the purpose of describing, and should not be construed as indicating or implying the degrees of importance.

In the description of the present application, it should be noted that, unless explicitly defined or limited otherwise, the terms "mount", "connect" and "link" should be interpreted broadly. For example, it may be fixed connection, detachable connection, or integral connection; it may be mechanical connection or electrical connection; and it may be direct connection or indirect connection by an intermediate medium, and may be the internal communication between two elements. For a person skilled in the art, the particular meanings of the above terms in the present application may be comprehended according to particular situations.

The idea of the present application is as follows. The head-mounted displaying device sends a locating and synchronizing signal to the handle regularly at a preset interval, and simultaneously the head-mounted displaying device controls the camera on it to expose and photograph the handle. After receiving the locating and synchronizing signal, the handle controls the LED light to lighten for a period of time within the exposure duration of the camera, so as to meet the requirement on the brightness for capturing the LED lights by the camera. Moreover, it controls the LED lights to lighten for a short time, thereby preventing the serious heating of the LED lights, reducing the power consumption of the handle, and improving the user experience.

Generally, the VR device comprises a head-mounted displaying device and at least one handle. If it comprises two handles, they may be referred as a left handle and a right handle. The head-mounted displaying device is provided with a camera, which may be but is not limited to an infrared camera. The handle is provided with an LED light ring. The head-mounted displaying device is connected with the handle in wireless communication, such as by using the wireless Bluetooth technique.

Figure 1:
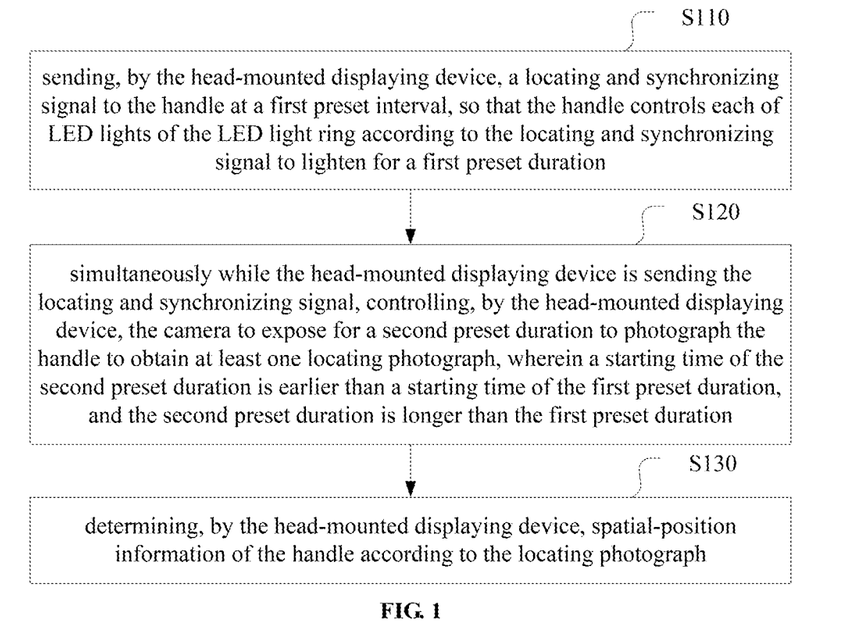
FIG. 1 shows a schematic flow chart of a method for locating a VR device according to an embodiment of the present application.

FIG. 1 shows a schematic flow chart of a method for locating a VR device according to an embodiment of the present application. The method comprises steps S110 to S130.

In step S110, the head-mounted displaying device sends a locating and synchronizing signal to the handle at a first preset interval, so that the handle controls each of LED lights of the LED light ring according to the locating and synchronizing signal to lighten for a first preset duration.

The VR device photographs the handle by using the camera on the head-mounted displaying device. According to the relative-position information of the LED light ring embedded on the surface of the handle, the spatial-position information of the handle can be obtained through a specific algorithm, so as to realize the spatial locating of the handle.

In one locating process of the VR device, the head-mounted displaying device sends one locating and synchronizing signal to the handle at the first preset interval, such as every 1 ms. The locating and synchronizing signal may be a regular wave, such as a rectangular wave. After receiving the locating and synchronizing signal, the handle controls the LED light ring embedded on its surface to lighten and keep lightened for the first preset duration, such as 40 μs. After the first preset duration lapses, the handle controls the LED light ring to turn off.

Because the angle of the handle surface with respect to the head-mounted displaying device vary, in order to prevent inaccurate locating or locating failure due to the absence of LED lights in the locating photographs obtained by the head-mounted displaying device, the left and right handles may both comprise a light ring composed of a plurality of LED lights.

In some embodiments of the present application, the LED light ring comprises 16 LED lights, each 4 of the 16 LED lights are connected in series to form a light string, and the 4 formed light strings are connected in parallel to form the light ring. The LED light ring with that structure cannot only ensure the handle locating accuracy of the head-mounted displaying device, but also reduce the number of LED lights, thereby reducing the overall power consumption of the handle.

In step S120, simultaneously while the head-mounted displaying device is sending the locating and synchronizing signal, the head-mounted displaying device controls the camera to expose for a second preset duration to photograph the handle to obtain at least one locating photograph, wherein the starting time of the second preset duration is earlier than the starting time of the first preset duration, and the second preset duration is longer than the first preset duration.

While sending the locating and synchronizing signal, the head-mounted displaying device controls the camera to expose for the second preset duration to photograph the handle. In the process of the photographing, at least one locating photograph can be obtained. In order to achieve better effects, in one locating process of the VR device, the head-mounted displaying device may send a plurality of locating and synchronizing signals to the handle to obtain multiple locating photographs.

It should be noted here that the starting time of the second preset duration is earlier than the starting time of the first preset duration, and the second preset duration is greater than the first preset duration. In other words, the first preset duration is within the length range of the second preset duration, and thus it can be ensured that the camera can obtain the photo of the handle when the LED light is lightened.

In step S130, the head-mounted displaying device determines the spatial-position information of the handle according to the locating photograph.

After obtaining the locating photograph, the head-mounted displaying device may determine the spatial-position information of the handle according to the locating photograph, to realize the multi-DOF (Degree of Freedom), such as 3DOF or 6DOF, locating of the user's hand.

The calculation method of the spatial-position information may refer to the prior art, and is not limited in the present application. When there are multiple locating photographs, it is recommended to fuse the multiple locating photographs and locate the handle according to the fused locating photograph.

According to the method shown in FIG. 1, in the present application, the head-mounted displaying device sends the locating and synchronizing signal to the handle periodically, so that the handle controls the LED lights on it to turn on and off periodically according to the locating and synchronizing signal, and simultaneously controls the camera on the head-mounted displaying device to expose and photograph the handle. Because the first preset duration of controlling the LED lights to be lightened each time is less than the second preset duration of the camera exposure, and the starting time of the second preset duration is earlier than the starting time of the first preset duration, the lightening of the LED lights on the handle is consistent with the exposure and photographing of the handle by the camera, so that the requirement on the brightness for capturing the LED lights by the camera can be met, and therefore the camera can accurately and stably capture the locating pictures of the handle. Moreover, the lightening duration of the LED lights is reduced, thereby significantly reducing the power consumption and the heating of the handle, which greatly improves the user experience.

In some embodiments of the present application, the first preset duration equals to multiplying the second preset duration to a preset duty ratio, wherein the preset duty ratio is less than or equal to a preset percentage.

The so-called duty ratio refers to the proportion of the power-on time relative to the total time in a pulse cycle. For example, for a pulse sequence having a pulse width of 1 μs and a signal period of 4 μs, the duty ratio is 25%. In the present application, the duty ratio may be understood as the ratio of the first preset duration to the second preset duration. For example, the second preset duration is one frame of the camera exposure, which may be set but is not limited to 33.33 ms. The LED lights are lightened for only 40 μs within the one frame, and will be turned off in the remaining time period (33.33 ms minus 40 μs). That duty ratio is very low, and is about 0.12%, which ensures that the average power consumption of the handle will be very low.

In addition, the power consumption of the LED lights is also related to the duty ratio. That can be simply understood as that the lower the duty ratio, the lower the power consumption of LED lights. In order to achieve the goal of reducing the power consumption of the handle, the duty ratio can be set to be less than or equal to a preset percentage, such as 0.12%.

In some embodiments of the present application, the step of controlling, by the handle, each of the LED lights of the LED light ring according to the locating and synchronizing signal to lighten for the first preset duration comprises: driving, by the handle, according to the locating and synchronizing signal, each of the LED lights of the LED light ring by a preset current value to lighten for the first preset duration, wherein the preset current value is greater than a current value specified for continuously lightening each of the LED lights.

The power consumption of the LED lights is not only related to the duty ratio, but also is closely related to the value of the current passing through them. The larger the current, the brighter the LED lights. In the prior art, due to the large energy consumption of the LED lights themselves, in order to increase the operating time, the LED lights are usually lightened with a regular current, such as 12 mA to 15 mA. However, in the present application, because the duration of continuous lightening of the LED light is effectively controlled to be far less than the duration of regular lightening in the prior art, the goal of saving energy consumption has been achieved. Therefore, in the present application, in order to enable the camera to capture clearer images, each of the LED lights may be driven to lighten by a current value greater than the regular current value and kept lightened for the first preset duration.

In some embodiments of the present application, the method according to the present application further comprises: sending a clock calibrating signal to the handle at a second preset interval to keep a clock of the handle consistent with a clock of the head-mounted displaying device.

In order to ensure that the clock of the handle is consistent with the clock of the head-mounted displaying device and further ensure that the exposure of the camera is synchronized with the turning on/off of the LED lights, the head-mounted displaying device sends one clock calibrating signal to the handle at the second preset interval, such as every 15 min. After receiving the clock calibrating signal, the handle performs clock calibration with the head-mounted displaying device, so as to keep the clock of the handle consistent with the clock of the head-mounted displaying device.

Figure 2:
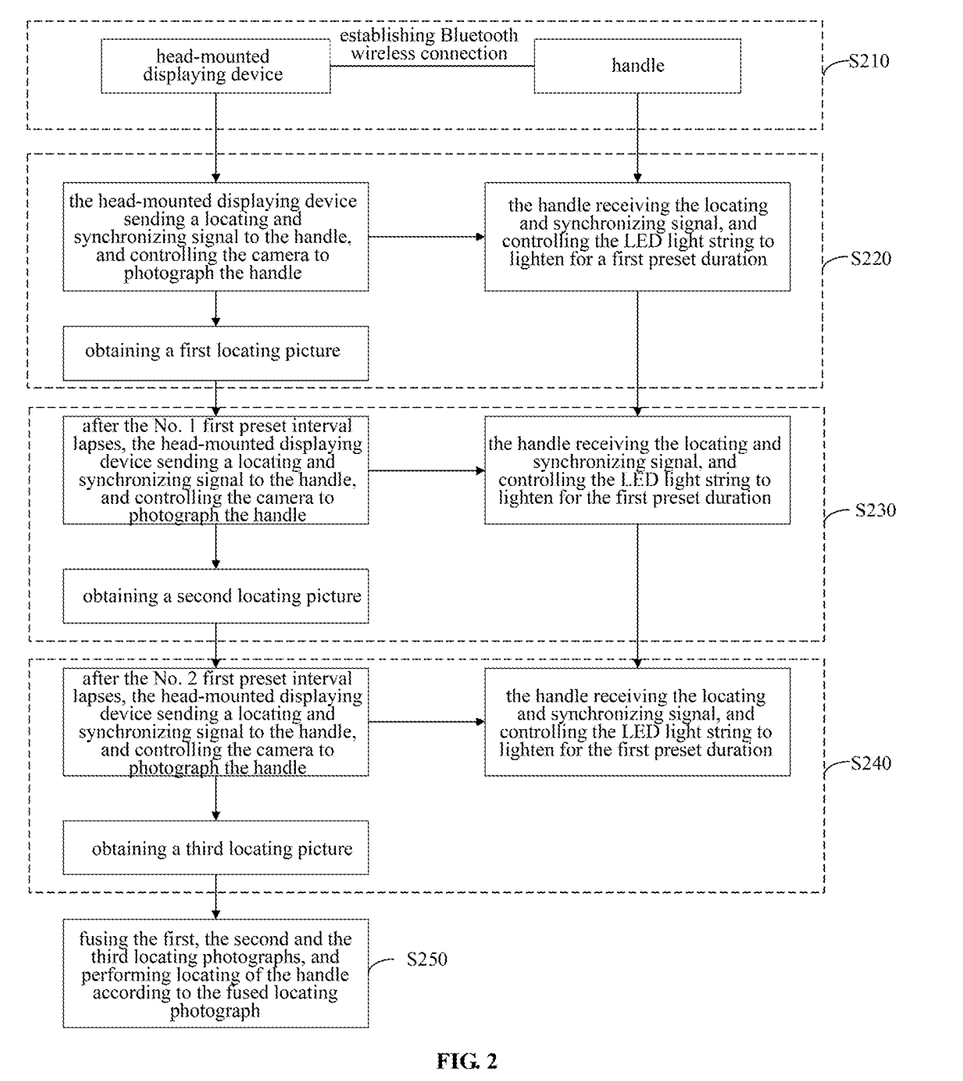
FIG. 2 shows a schematic flow chart of a method for locating a VR device according to another embodiment of the present application.

FIG. 2 shows a schematic flow chart of a method for locating a VR device according to another embodiment of the present application. The embodiment comprises steps S210 to S250.

In step S210, the head-mounted displaying device establishes a Bluetooth wireless connection with the handle.

In step S220, the head-mounted displaying device sends a locating and synchronizing signal to the handle, the handle receives the locating and synchronizing signal and controls the LED light string to lighten for a first preset duration, and the head-mounted displaying device controls the camera to photograph the handle to obtain a first locating picture.

In step S230, after the No. 1 first preset interval lapses, the head-mounted displaying device sends a locating and synchronizing signal to the handle, the handle receives the locating and synchronizing signal and controls the LED light ring to lighten for the first preset duration, and the head-mounted displaying device controls the camera to photograph the handle to obtain a second locating picture.

In step S240, after the No. 2 first preset interval lapses, the head-mounted displaying device sends a locating and synchronizing signal to the handle, the handle receives the locating and synchronizing signal and controls the LED light ring to lighten for the first preset duration, and the head-mounted displaying device controls the camera to photograph the handle to obtain a third locating picture.

In step S250, the head-mounted displaying device fuses the first, the second and the third locating photographs, and performs locating of the handle according to the fused locating photograph.

It should be noted that, when there are two or more handles, the interactions between the head-mounted displaying device and each of the handles are synchronous.

Figure 3:
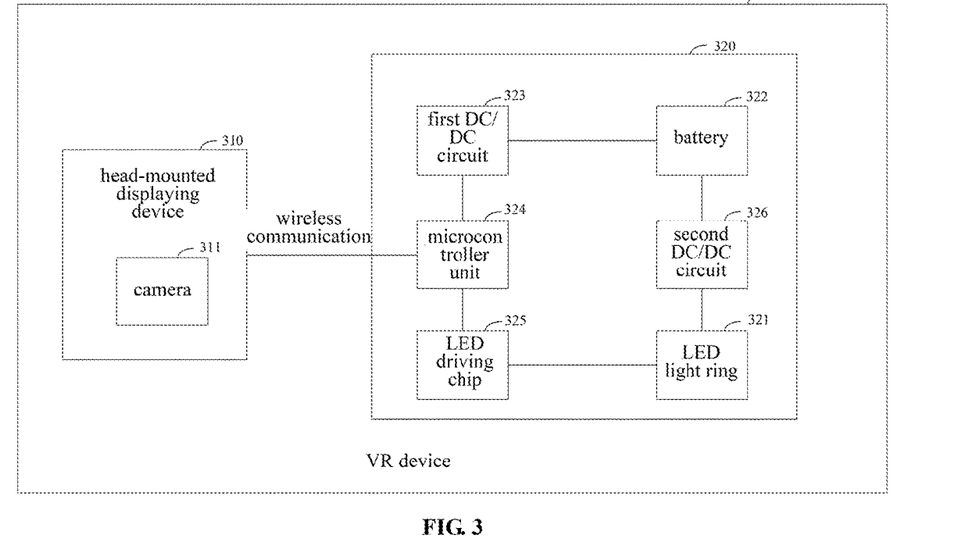
FIG. 3 shows a schematic structural diagram of a VR device according to an embodiment of the present application.

FIG. 3 shows a schematic structural diagram of a VR device according to an embodiment of the present application. The VR device 300 comprises a head-mounted displaying device 310 and at least one handle 320. The head-mounted displaying device 310 is connected with the handle 320 in wireless communication. The head-mounted displaying device 310 is provided with a camera 311 for photographing the handle 320 to obtain locating photographs.

The handle 320 is provided with an LED light ring 321. The handle 320 further comprises a battery 322, a first DC/DC circuit 323, a microcontroller unit 324, an LED driving chip 325 and a second DC/DC circuit 326. The battery 322 is electrically connected to the cathode of the LED light ring 321 through the first DC/DC circuit 323, the microcontroller unit 324 and the LED driving chip 325 in sequence. The battery 322 is electrically connected to the anode of the LED light ring 321 through the second DC/DC circuit 326. DC is short for direct current, and DC/DC represents direct-current conversion; in other words, a high-voltage (or low-voltage) direct-current power supply is converted into a low-voltage (or high-voltage) direct-current power supply.

In the above circuit, the battery 322 supplies power to the microcontroller unit 324 through the first DC/DC circuit 323. The first DC/DC circuit 323 can convert the power-supply voltage outputted from the battery 322 into the voltage required by the microcontroller unit 324, for example from 5V to 3.6V.

The second DC/DC circuit 326 is configured for raising the power-supply voltage of the battery 322 to a preset voltage for lightening each of the LED lights. If the power-supply voltage of the battery 322 is 5V, the second DC/DC circuit 326 may raise it to 12V to be able to lighten each of the LED lights of the LED light ring 321.

The LED driving chip 325 is configured for setting according to the instruction of the microcontroller unit 324 a current value when each of the LED lights is lightened. In some embodiments of the present application, the current value may be greater than the regular current value of the LED lights.

The head-mounted displaying device 310 sends a locating and synchronizing signal to the microcontroller unit 324 of the handle 320 at a first preset interval, so that the microcontroller unit 324 controls the LED driving chip 325 according to the locating and synchronizing signal to drive each of the LED lights of the LED light ring 321 to lighten for a first preset duration.

While sending the locating and synchronizing signal, the head-mounted displaying device 310 controls the camera 311 to expose for a second preset duration to photograph the handle 320 to obtain at least one locating picture, wherein the starting time of the second preset duration is earlier than the starting time of the first preset duration, and the second preset duration is longer than the first preset duration.

The head-mounted displaying device 310 determines the spatial-position information of the handle 320 according to the locating photograph.

In some embodiments of the present application, the first preset duration equals to multiplying the second preset duration to a preset duty ratio, wherein the preset duty ratio is less than or equal to a preset percentage.

In some embodiments of the present application, the handle 320 controls the LED driving chip 325 according to the locating and synchronizing signal to drive each of the LED lights of the LED light ring 321 by a preset current value to lighten for the first preset duration, wherein the preset current value is greater than a current value specified for continuously lightening each of the LED lights.

In some embodiments of the present application, the head-mounted displaying device 310 sends a clock calibrating signal to the handle 320 at a second preset interval to keep the clock of the handle 320 consistent with the clock of the head-mounted displaying device 310.

In some embodiments of the present application, the LED light ring 321 comprises 16 LED lights, each 4 of the 16 LED lights are connected in series to form a light string, and the 4 formed light strings are connected in parallel.

It can be understood that the VR device can implement the steps of the method for locating a VR device according to the above embodiments, and the relevant description on the method for locating a VR device is applicable to the VR device, and will not be repeated here.

Figure 4:
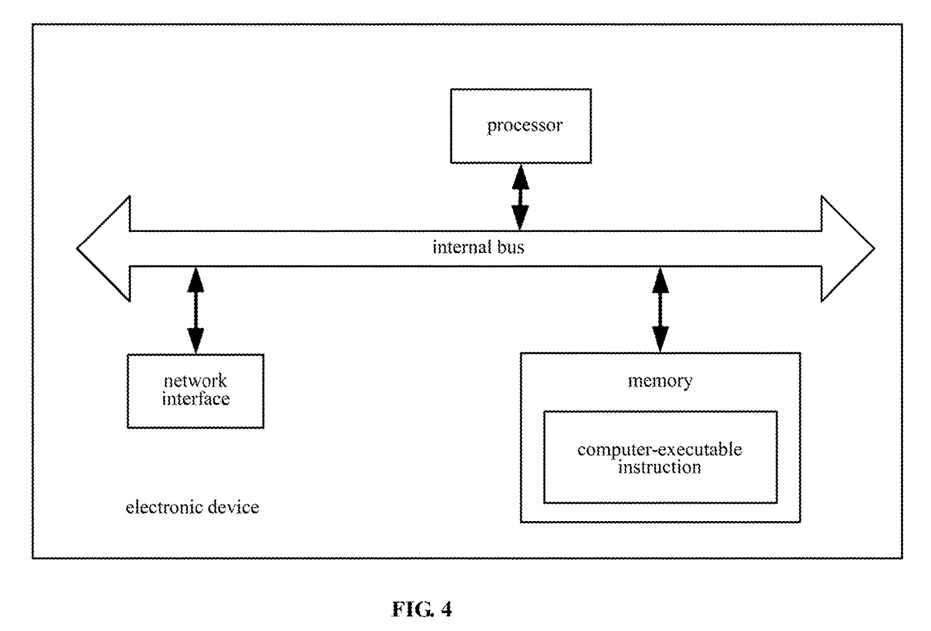
FIG. 4 shows a schematic structural diagram of an electronic device according to an embodiment of the present application.

FIG. 4 is a schematic structural diagram of an electronic device according to an embodiment of the present application. Referring to FIG. 4, at the hardware level, the electronic device comprises a processor, and optionally an internal bus, a network interface and a memory. The memory may comprise an internal memory, such as a high-speed random access memory (RAM), or a non-volatile memory, such as at least one disk memory, etc. Certainly, the electronic device may also comprise other hardware as required.

The processor, the network interface, and the memory may be interconnected through the internal bus. The internal bus may be an ISA (Industry Standard Architecture) bus, a PCI (Peripheral Component Interconnect) bus or an EISA (Extended Industry Standard Architecture) bus, etc. The bus may be divided into an address bus, a data bus, a control bus, etc. For ease of representation, only one bidirectional arrow is used in FIG. 4, but that does not mean that there is only one bus or one type of bus.

The memory is configured to store a program. Particularly, the program may include program codes which include computer operation instructions. The memory may include an internal memory and a nonvolatile memory, and provide instructions and data to the processor.

The processor reads the corresponding computer program from the nonvolatile memory into the internal memory and then runs it to form the head-mounted displaying device of the VR device at the logical level.

The processor executes the program stored in the memory and is particularly configured to implement the following operations:

sending, by the head-mounted displaying device, a locating and synchronizing signal to the handle at a first preset interval, so that the handle controls each of LED lights of the LED light ring according to the locating and synchronizing signal to lighten for a first preset duration;

simultaneously while the head-mounted displaying device is sending the locating and synchronizing signal, controlling, by the head-mounted displaying device, the camera to expose for a second preset duration to photograph the handle to obtain at least one locating photograph, wherein a starting time of the second preset duration is earlier than a starting time of the first preset duration, and the second preset duration is longer than the first preset duration; and determining, by the head-mounted displaying device, spatial-position information of the handle according to the locating photograph.

The above method for locating a VR device according to the embodiment shown in FIG. 1 of the present application can be applied to the processor or implemented by the processor. The processor may be an integrated circuit chip having signal processing capabilities. In the implementation process, the steps of the method described above can be completed by integrated logic circuits (in the form of hardware) or instructions (in the form of software) in the processor. The processor may be a general-purpose processor, including a Central Processing Unit (CPU), a Network Processor (NP), etc. It may also be a Digital Signal Processor (DSP), an Application Specific Integrated Circuit (ASIC), a Field-Programmable Gate Array (FPGA) or other programmable logic devices, discrete gates or transistor logic devices, discrete hardware components, which can implement or execute the methods, steps, and logical block diagrams according to the embodiments of the present application. The general-purpose processor may be a microprocessor or any conventional processor. The steps of the method according to the embodiments of the present application can be directly embodied as hardware and executed by a decoding processor, or executed by a combination of hardware in the decoding processor and software modules. The software modules can be located in a storage medium well known in the art such as a random access memory, a flash memory, a read-only memory, a programmable read-only memory, or an electrically erasable programmable memory, a registers, etc. The storage medium is located in the memory, and the processor reads the information in the memory and cooperates with its hardware to complete the steps of the above method.

The electronic device may be particularly the VR device in FIG. 3 and realize the function of the VR device in the embodiment shown in FIG. 3, which will not be repeated here.

An embodiment of the present application further provides a computer-readable storage medium, the computer-readable storage medium stores one or more programs, and the one or more programs contains instructions. When executed by an electronic device containing multiple application programs, the instructions can cause the electronic device to implement the method for locating a VR device according to the embodiment shown in FIG. 1. Particularly, it is used to execute the following operations:

sending, by the head-mounted displaying device, a locating and synchronizing signal to the handle at a first preset interval, so that the handle controls each of LED lights of the LED light ring according to the locating and synchronizing signal to lighten for a first preset duration;

simultaneously while the head-mounted displaying device is sending the locating and synchronizing signal, controlling, by the head-mounted displaying device, the camera to expose for a second preset duration to photograph the handle to obtain at least one locating photograph, wherein a starting time of the second preset duration is earlier than a starting time of the first preset duration, and the second preset duration is longer than the first preset duration; and determining, by the head-mounted displaying device, spatial-position information of the handle according to the locating photograph.

A person skilled in the art should understand that the embodiments of the present application may be provided as a method, a system, or a computer program product. Therefore, the present application may take the form of a complete hardware embodiment, a complete software embodiment, or an embodiment combining software and hardware. Furthermore, the present application may take the form of a computer program product implemented on one or more computer-usable storage media (including but not limited to a disk storage, a CD-ROM, an optical memory and so on) containing a computer-usable program code therein.

The present application is described with reference to the flow charts and/or block diagrams of the method, the device (system), and the computer program product according to the embodiments of the present application. It should be understood that each flow and/or block in the flow charts and/or block diagrams, and combinations of the flows and/or blocks in the flow charts and/or block diagrams, may be implemented by a computer program instruction. The computer program instructions may be provided to a processor of a general-purpose computer, a special-purpose computer, an embedded processor, or another programmable data processing device to generate a machine, so that a device for implementing the functions specified in one or more flows of the flow charts and/or one or more blocks of the block diagrams can be generated by instructions executed by the processor of the computers or the other programmable data processing device.

The computer program instructions may also be stored in a computer-readable memory that can instruct the computers or the other programmable data processing device to operate in a specific mode, so that the instructions stored in the computer-readable memory generate an article comprising an instruction device, and the instruction device implements the functions specified in one or more flows of the flow charts and/or one or more blocks of the block diagrams.

The computer program instructions may also be loaded to the computers or the other programmable data processing device, so that the computers or the other programmable data processing device implement a series of operation steps to generate the computer-implemented processes, whereby the instructions executed in the computers or the other programmable data processing device provide the steps for implementing the functions specified in one or more flows of the flow charts and/or one or more blocks of the block diagrams.

It should be noted that the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

A person skilled in the art should understand that the embodiments of the present application may be provided as a method, a system, or a computer program product. Therefore, the present application may take the form of a complete hardware embodiment, a complete software embodiment, or an embodiment combining software and hardware. Furthermore, the present application may take the form of a computer program product implemented on one or more computer-usable storage media (including but not limited to a disk storage, a CD-ROM, an optical memory and so on) containing a computer-usable program code therein.

The above are merely embodiments of the present application, and are not indented to limit the present application. For a person skilled in the art, the present application may have various modifications and variations. Any modifications, equivalent substitutions and improvements that are made within the spirit and the principle of the present application should fall within the protection scope of the claims the present application.

What is claimed is:

1. A method for locating a VR device, wherein the VR device comprises a head-mounted displaying device and at least one handle, the head-mounted displaying device is provided with a camera, the handle is provided with an LED light ring, and the head-mounted displaying device is connected with the handle in wireless communication, wherein the method comprises:
sending, by the head-mounted displaying device, a locating and synchronizing signal to the handle at a first preset interval, so that the handle controls each of LED lights of the LED light ring according to the locating and synchronizing signal by a preset current value to lighten for a first preset duration, wherein the preset current value is greater than a current value specified for continuously lightening each of the LED lights;
simultaneously while the head-mounted displaying device is sending the locating and synchronizing signal, controlling, by the head-mounted displaying device, the camera to expose for a second preset duration to photograph the handle to obtain at least one locating photograph, wherein a starting time of the second preset duration is earlier than a starting time of the first preset duration, and the second preset duration is longer than the first preset duration; and
determining, by the head-mounted displaying device, spatial-position information of the handle according to the locating photograph,
wherein the first preset duration equals to multiplying the second preset duration to a preset duty ratio, wherein the preset duty ratio is less than or equal to a preset percentage.

2. The method according to claim 1, further comprising:
sending, by the head-mounted displaying device, a clock calibrating signal to the handle at a second preset interval to keep a clock of the handle consistent with a clock of the head-mounted displaying device.

3. The method according to claim 1, wherein the LED light ring comprises 16 LED lights, each 4 of the 16 LED lights are connected in series to form a light string, and the 4 formed light strings are connected in parallel.

4. A VR device, wherein the VR device comprises a head-mounted displaying device and at least one handle, the head-mounted displaying device is provided with a camera, the handle is provided with an LED light ring, and the head-mounted displaying device is connected with the handle in wireless communication;
the handle comprises a battery, a first DC/DC circuit, a microcontroller unit, an LED driving chip and a second DC/DC circuit;
the battery is electrically connected to a cathode of each of the LED lights of the LED light ring through the first DC/DC circuit, the microcontroller unit and the LED driving chip in sequence; and
the battery is electrically connected to an anode of each of the LED lights of the LED light ring through the second DC/DC circuit, and the battery supplies power to the microcontroller unit through the first DC/DC circuit;
wherein the second DC/DC circuit is configured for raising a power-supply voltage of the battery to a preset voltage for lightening each of the LED lights of the LED light ring, and the LED driving chip is configured for setting a current value when each of the LED lights of the LED light ring is lightened;
the head-mounted displaying device sends a locating and synchronizing signal to the microcontroller unit of the handle at a first preset interval, so that the microcontroller unit controls the LED driving chip according to the locating and synchronizing signal by a preset current value to drive each of the LED lights of the LED light ring to lighten for a first preset duration, wherein the preset current value is greater than a current value specified for continuously lightening each of the LED lights;
simultaneously while the head-mounted displaying device is sending the locating and synchronizing signal, the head-mounted displaying device controls the camera to expose for a second preset duration to photograph the handle to obtain at least one locating photograph, wherein a starting time of the second preset duration is earlier than a starting time of the first preset duration, and the second preset duration is longer than the first preset duration;
the head-mounted displaying device determines spatial-position information of the handle according to the locating photograph, and
wherein the first preset duration equals to multiplying the second preset duration to a preset duty ratio, wherein the preset duty ratio is less than or equal to a preset percentage.

5. The VR device according to claim 4, wherein the head-mounted displaying device sends a clock calibrating signal to the handle at a second preset interval to keep a clock of the handle consistent with a clock of the head-mounted displaying device.

6. The VR device according to claim 4, wherein the LED light ring comprises 16 LED lights, each 4 of the 16 LED lights are connected in series to form a light string, and the 4 formed light strings are connected in parallel.

* * * * *